United States Patent
Mossman et al.

(10) Patent No.: US 7,394,519 B1
(45) Date of Patent: Jul. 1, 2008

(54) SYSTEM AND METHOD FOR AUDIO ENCODING AND COUNTERFEIT TRACKING A MOTION PICTURE

(75) Inventors: Colin F. Mossman, Los Angeles, CA (US); Joseph C. Wary, Chatsworth, CA (US)

(73) Assignee: Deluxe Laboratories, Inc., Hollywood, CA (US)

( * ) Notice: Subject to any disclaimer, the term of this patent is extended or adjusted under 35 U.S.C. 154(b) by 0 days.

(21) Appl. No.: 11/672,882

(22) Filed: Feb. 8, 2007

(51) Int. Cl.
G03B 31/02 (2006.01)
G03B 21/32 (2006.01)

(52) U.S. Cl. .......................... 352/27; 352/85
(58) Field of Classification Search .................... 352/5, 352/17, 27, 38, 85, 90, 92
See application file for complete search history.

(56) References Cited

U.S. PATENT DOCUMENTS

| | | | |
|---|---|---|---|
| 5,809,160 A | 9/1998 | Powell et al. | |
| 5,930,377 A | 7/1999 | Powell et al. | |
| 6,289,108 B1 | 9/2001 | Rhoads | |
| 6,307,949 B1 | 10/2001 | Rhoads | |
| 6,353,672 B1 | 3/2002 | Rhoads | |
| 6,542,620 B1 | 4/2003 | Rhoads | |
| 6,681,029 B1 | 1/2004 | Rhoads | |
| 6,738,495 B2 | 5/2004 | Rhoads et al. | |
| 6,760,463 B2 | 7/2004 | Rhoads | |
| 6,778,682 B2 | 8/2004 | Rhoads | |
| 6,920,232 B2 | 7/2005 | Rhoads | |
| 6,975,744 B2 | 12/2005 | Sharma et al. | |
| 6,988,202 B1 | 1/2006 | Rhoads et al. | |
| 7,003,132 B2 | 2/2006 | Rhoads | |
| 7,062,070 B2 | 6/2006 | Powell et al. | |
| 7,068,811 B2 | 6/2006 | Powell et al. | |
| 7,113,614 B2 | 9/2006 | Rhoads | |
| 7,116,781 B2 | 10/2006 | Rhoads | |
| 7,184,570 B2 | 2/2007 | Rhoads | |
| 2003/0187679 A1* | 10/2003 | Odgers et al. ................. 705/1 |
| 2005/0053235 A1 | 3/2005 | Clark et al. | |
| 2006/0015464 A1 | 1/2006 | Dewolde | |
| 2006/0277609 A1* | 12/2006 | Brandon ...................... 726/28 |
| 2006/0294016 A1* | 12/2006 | Hunter et al. ................ 705/58 |

\* cited by examiner

*Primary Examiner*—Rodney E Fuller
(74) *Attorney, Agent, or Firm*—Greenberg Traurig LLP; Bradley D. Blanche

(57) ABSTRACT

A system and method is provided for encoding an identifiable code into the audio content of a motion picture. The audio content is altered in at least one specific pre-selected location in the audio soundtrack of the motion picture so as to be essentially unnoticeable to the listener. The audio content is altered to form an audio code which represents a unique number applied to that copy of the motion picture, whereupon any audio recording of such audio content would capture the audio code. The unique number is stored together with an identification of the location, entity or person who receives the copy when it is distributed, so as to enable suspected counterfeit copies of the motion picture to be analyzed to read the code number and identify the recipient of the copy and thereby track down the source of the counterfeit copies.

26 Claims, 7 Drawing Sheets

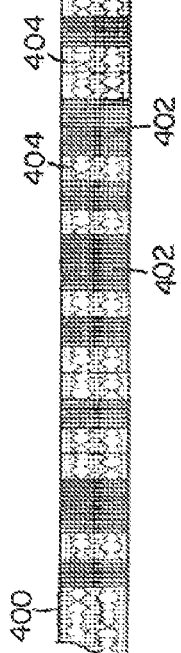
FIG. 4A
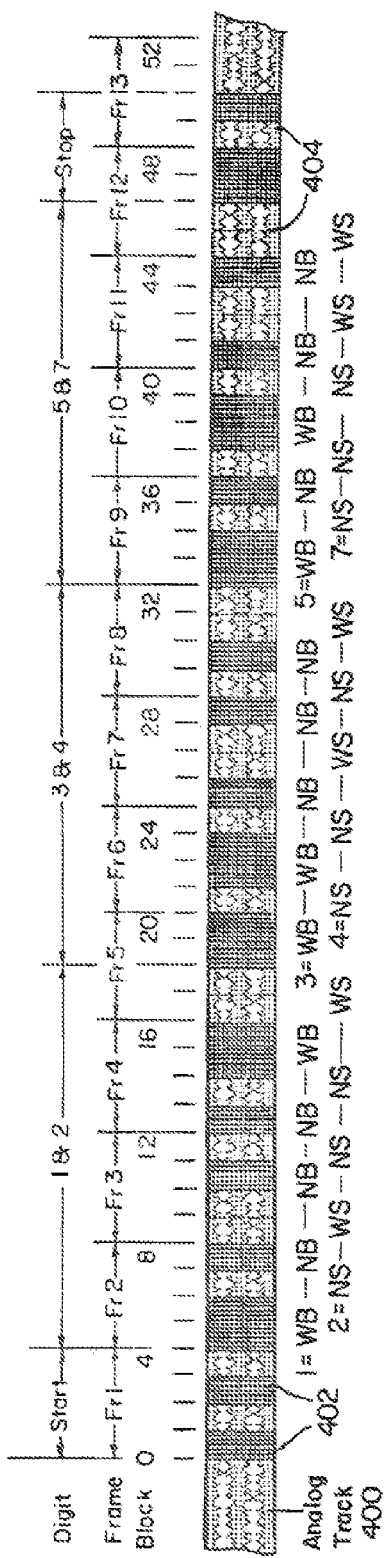
FIG. 4B
FIG. 4C

SYSTEM AND METHOD FOR AUDIO ENCODING AND COUNTERFEIT TRACKING A MOTION PICTURE

TECHNICAL FIELD

This disclosure relates generally to the field of tracking of pirated media and, more particularly, to a system and method for audio encoding media for identifying the sources of copies of a pirated media.

BACKGROUND

"Motion picture," as the term is used herein, includes any type of audio-visual content stored on a medium of expression. It can include movies, episodes of broadcast television programs, corporate events, or other audio-visual content. The production and sale of counterfeit copies of motion pictures is a serious problem of long standing in the motion picture industry. Counterfeit copies of new motion pictures sometimes are sold to the public even before the motion picture has been released by the motion picture studio. These counterfeit copies are hard to trace, and it is a difficult job to identify and bring the counterfeiters to justice.

A particularly crude but widespread type of counterfeiting is the use of a video camera to copy a motion picture film projected on a motion picture theater screen. The copy made by this technique then is converted to a distributable format (e.g., DVD, video tape or digital file), and the illegal copies are sold to the public and otherwise distributed.

Attempts have been made in the past to stem the tide of such counterfeits by embedding identifiable codes into the images of the motion pictures. Such approaches can be useful in tracing the sources of where counterfeits of motion pictures were originally captured by a video camera. In theory, when a counterfeiter makes a video copy of the film, the identifiable codes also will be copied. Then, after the counterfeit has been distributed, it can be viewed by content owners, industry associations (e.g., MPAA), law enforcement personnel and other interested parties to determine which print of the film was copied. When that print number is traced to the theater or other location in which it was shown (sometimes at a preview prior to the formal release of the film) the counterfeiter can be identified as someone who had access to the screening.

One drawback associated with solely relying upon identifiable codes embedded into the video portion of the motion picture is that counterfeiting operations often combine video recordings taken from one location with audio recordings taken from another location in order to produce the final counterfeit copies that are distributed. Video and audio recordings of the same motion picture can be taken from a variety of different locations, where the particular video and audio recordings with the least number of defects or disturbances can be matched together to produce a counterfeit copy that most closely resembles the motion picture being copied. Further, when counterfeit copies are distributed in different languages in different countries, audio recordings from one language can be combined with a video recording from another location to produce a counterfeit copy in a different language. Once a counterfeiter obtains a clean copy of the video recording, this single video recording can be combined with respective audio recordings from other countries to produce counterfeit copies in various different languages. Thus, relying on counterfeit tracking mechanisms that focus solely on the video portion of the motion picture may not reveal information about where the audio portion of the counterfeit copy may have been pirated.

There have been attempts at audio watermarking motion pictures by inserting a particular artifact into a soundtrack of a copy of the motion picture at a particular location, where the location of such artifact in the soundtrack was specific to a particular copy of the motion picture. These prior techniques required different locations for the artifacts to be inserted into each copy of a motion picture, thereby limiting the number of different copies that can be made to the number of different locations an artifact can be placed. This also requires knowledge of the locations of where each artifact appears in each and every copy of the motion picture in order to determine sources of origin. Further, artifacts may be more noticeable in certain locations of a motion picture than in other, locations, thereby creating non-uniformity in both the quality of the copies of the motion pictures that are distributed and the usefulness of the artifacts.

SUMMARY

According to a feature of the disclosure, a system and method is provided for encoding an identifiable code into the content of an audio recording, such as a copy of a motion picture. The audio content is altered in at least one specific pre-selected location in the audio soundtrack of the copy so as to be essentially unnoticeable to a listener. The audio content is altered to form an identifiable code which represents a unique number applied to that copy of the motion picture, whereupon any audio recording of the playback of such audio content would capture the identifiable code. The unique number is recorded and stored, together with an identification of the person or entity who receives the copy when it is distributed, so as to enable law enforcement personnel to review suspected counterfeit copies of the motion picture to read the code number and identify the recipient of the copy and thereby track down the source of the counterfeit copies.

In one embodiment, the identifiable code inserted into an analog soundtrack of the copy of the motion picture by inserting periods of silence into the analog soundtrack to create alternating sequences of audio content and silence that will be broadcast with the motion picture. The location of the identifiable code in the audio soundtrack is selected so as to minimize the noticeable effects of the presence of the code during playback of the audio soundtrack.

In one embodiment, the audio soundtrack is altered to ensure that playback of the audio soundtrack reverts from a digital recording on the copy of the motion picture to the analog recording of the soundtrack at the selected location where the identifiable code is inserted into the audio soundtrack.

In one aspect, each copy of the motion picture has its audio soundtrack altered differently so that each copy of the motion picture has its own unique code, where the alterations to the audio soundtrack occur at selected locations in the audio soundtrack in all of the copies. The use of a unique code for each copy of the motion picture allows each copy to be uniquely identified, while the positioning of the identifiable codes at selected locations in all of the copies allow the identifiable codes to be located at known locations to provide more efficient forensic investigations on the copies to determine source of origin. In another aspect, the identifiable codes are positioned at the same locations in all of the copies to allow the identifiable codes to be uniformly positioned and more easily located.

DRAWINGS

The above-mentioned features and objects of the present disclosure will become more apparent with reference to the following description taken in conjunction with the accompanying drawings wherein like reference numerals denote like elements and in which:

FIGS. 4A-4C are illustrations of the coding of an analog soundtrack in accordance with one exemplary embodiment of the present disclosure.

DETAILED DESCRIPTION

The present disclosure describes a system and method for audio encoding soundtrack content stored on a storage media with an identifiable code. In the following description, numerous embodiments are set forth in order to provide a thorough understanding of the invention. It will be apparent, however, to one skilled in the art, that these and other embodiments may be practiced without these specific details. In other instances, well-known features have not been described in detail in order not to obscure the invention.

In a preferred embodiment, the present disclosure will be described herein as being directed to inserting an identifiable code into an audio recording of a motion picture soundtrack recorded on film. Multiple copies of motion pictures are typically made from a single master recording of the motion picture, where the present disclosure recites a method of encoding a unique identifiable code into the soundtrack of each film copy or film print of the motion picture so that each copy of the motion picture can be separately traceable based on its respective unique identifiable code. However, it is understood that the teachings of the present disclosure can also be utilized in other types of audio content recorded on other types of media.

Figure 1:
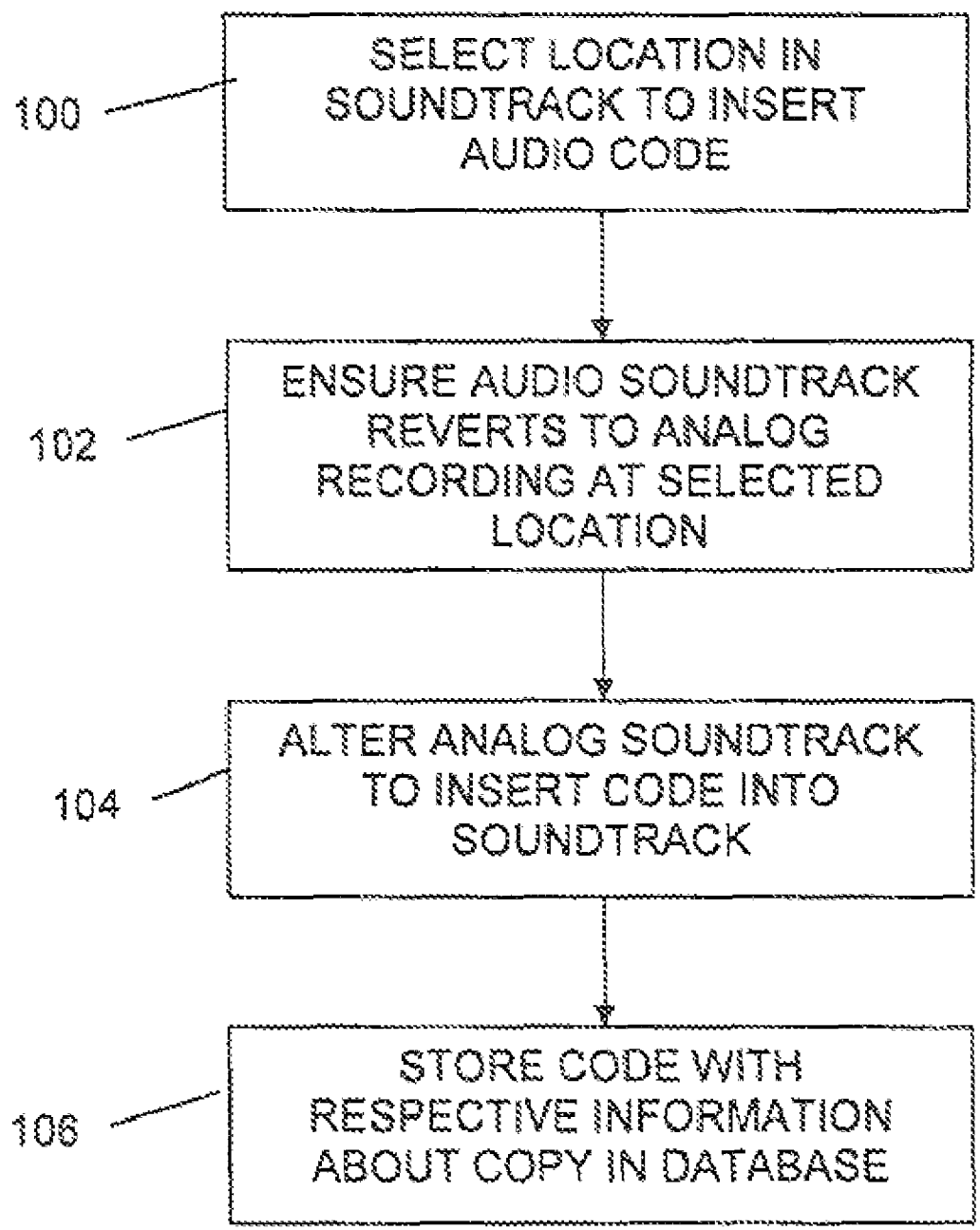
FIG. 1 is a flow diagram of a method for inserting an audio code into a audio soundtrack in accordance with one embodiment of the present disclosure.

Referring now to FIG. 1, an operational flow diagram is provided for one embodiment of a method of audio encoding soundtrack content stored on a storage media with an identifiable code. In operation 100, a location in the audio soundtrack of the motion picture to insert the identifiable code is selected based upon the sound characteristics of the audio soundtrack. The location is preferably selected so as to minimize the noticeable effects of the presence of the code during playback or performance of the audio soundtrack. In one aspect, the location to insert the identifiable code is selected such that it will be substantially unheard by a listener. In another aspect, the location of the identifiable code may be selected so that, while noticeable by a listener, it simulates a desired sound effect, again so that the presence of the code does not interfere with the enjoyment of the audio soundtrack.

In one embodiment, the identifiable code is inserted into an analog recording of the audio soundtrack stored on the film copy of the motion picture. In operation 102, the audio soundtrack is altered to ensure that playback of the audio soundtrack reverts to the analog recording of the soundtrack at the location in the audio soundtrack selected for the insertion of the identifiable code. In one aspect, the recording medium, e.g., motion picture film copy, may include an analog recording of the audio soundtrack and at least one digital recording of the audio soundtrack. Motion pictures are typically produced with an analog soundtrack and multiple digital soundtracks (e.g., Dolby SRD, Sony SDDS, DTS, etc.) so that the same film copy of a motion picture is capable of being played on a variety of different theater sound systems, where different movie theaters may use different sound systems. Digital soundtracks often provide more robust sound characteristics than analog soundtracks, where the analog soundtrack is typically only used as a backup to the digital soundtrack in case the digital soundtrack becomes damaged or difficult to read. Thus, in operation 102, the film copy is modified to ensure that the audio soundtrack switches to, reverts to or otherwise plays the analog recording of the audio soundtrack at the selected location for the identifiable code instead of the digital recording during playback of the motion picture.

The analog soundtrack is altered in operation 104 to insert the identifiable code into the audio soundtrack at the selected location. A plurality of locations in the audio soundtrack may be selected, such that the analog soundtrack may be similarly altered at various locations in the audio soundtrack to insert repeated occurrences of the identifiable code throughout the audio soundtrack. In one aspect, each copy of the motion picture has its audio soundtrack altered differently so that each copy of the motion picture has its own unique code, where the alterations to the audio soundtrack preferably occur at the same locations in the audio soundtrack in all of the copies of the motion picture. The use of a unique code for each copy of the motion picture allows each copy to be uniquely identified, while the positioning of the identifiable codes at the same locations in all of the copies allow the identifiable codes to be easily located at known uniform locations when performing forensic analysis on the copies to determine source of origin.

The identifiable code that is inserted into the audio soundtrack is then stored in a database together with distribution information related to each copy of the motion picture in operation 106, such as the location, entity or person who receives the distributed copy of the motion picture. This stored information may subsequently be utilized in forensic analysis so as to enable suspected counterfeit copies of the motion picture to be analyzed to read the code number present in the audio soundtrack to identify the recipient of the copy and thereby track down the source of the counterfeit copies.

Figure 2:
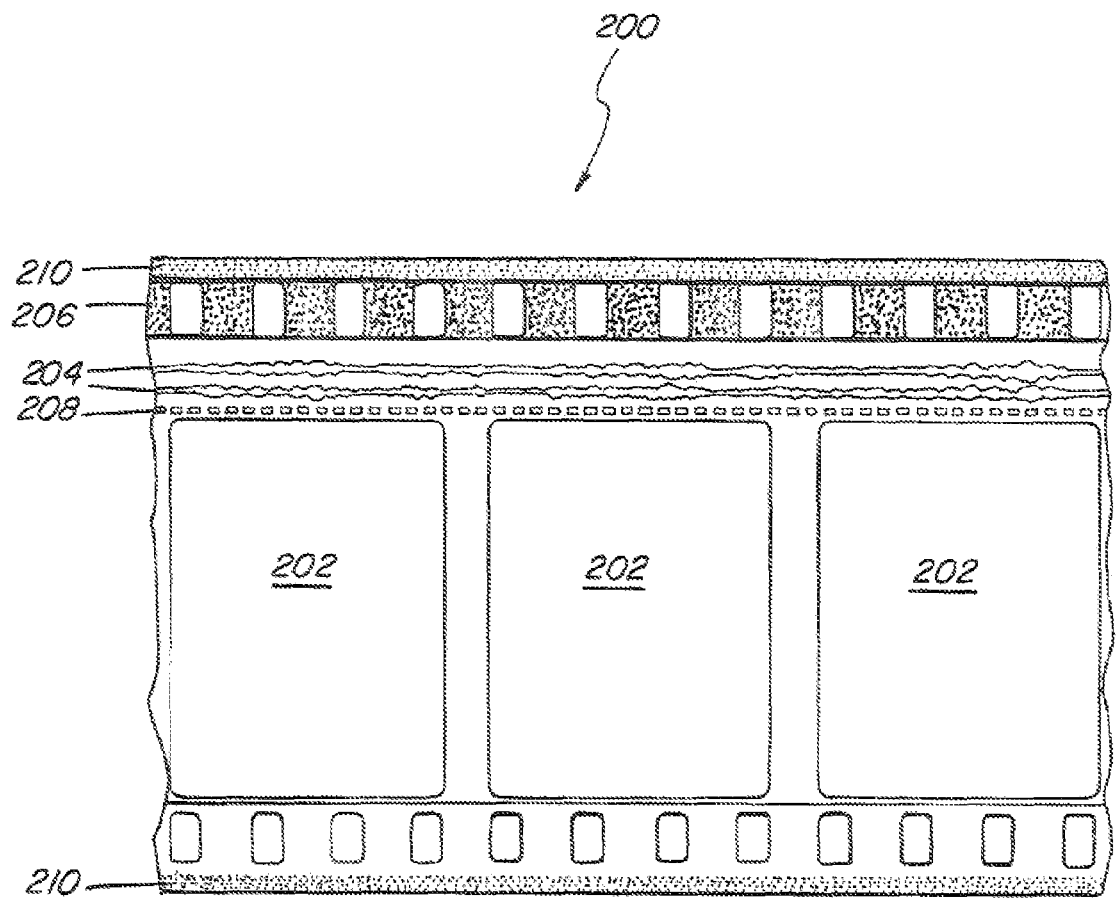
FIG. 2 is an illustration of a segment of motion picture film.

Referring now to FIG. 2, a representative illustration of a segment of motion picture film 200 is provided having a plurality of frames 202. The film 200 includes an analog soundtrack 204 stored thereon. In one embodiment, the film 200 may also include at least one digital soundtrack stored thereon. Digital soundtracks may include Dolby SR-D 206, DTS 208, Sony SDDS 210 or any other recorded digital audio soundtrack. When both analog and digital soundtracks are recorded on the film 200, the digital soundtracks are altered so as to cause the motion picture player to revert to the analog soundtrack 204 when approaching the selected location for the insertion of the identifiable code. The digital soundtracks can be altered by re-exposing certain portions of the digital soundtracks for selected periods of time or otherwise causing those certain portions of the digital soundtracks to be unreadable, thereby causing playback of the audio soundtrack to revert from the digital soundtrack to the analog soundtrack. Re-exposing refers to any process of interrupting the content recorded on the film print, such as, for example, by exposing the film print to certain light that causes the exposed film print and the previously recorded information in those areas to become unreadable.

Figure 3:
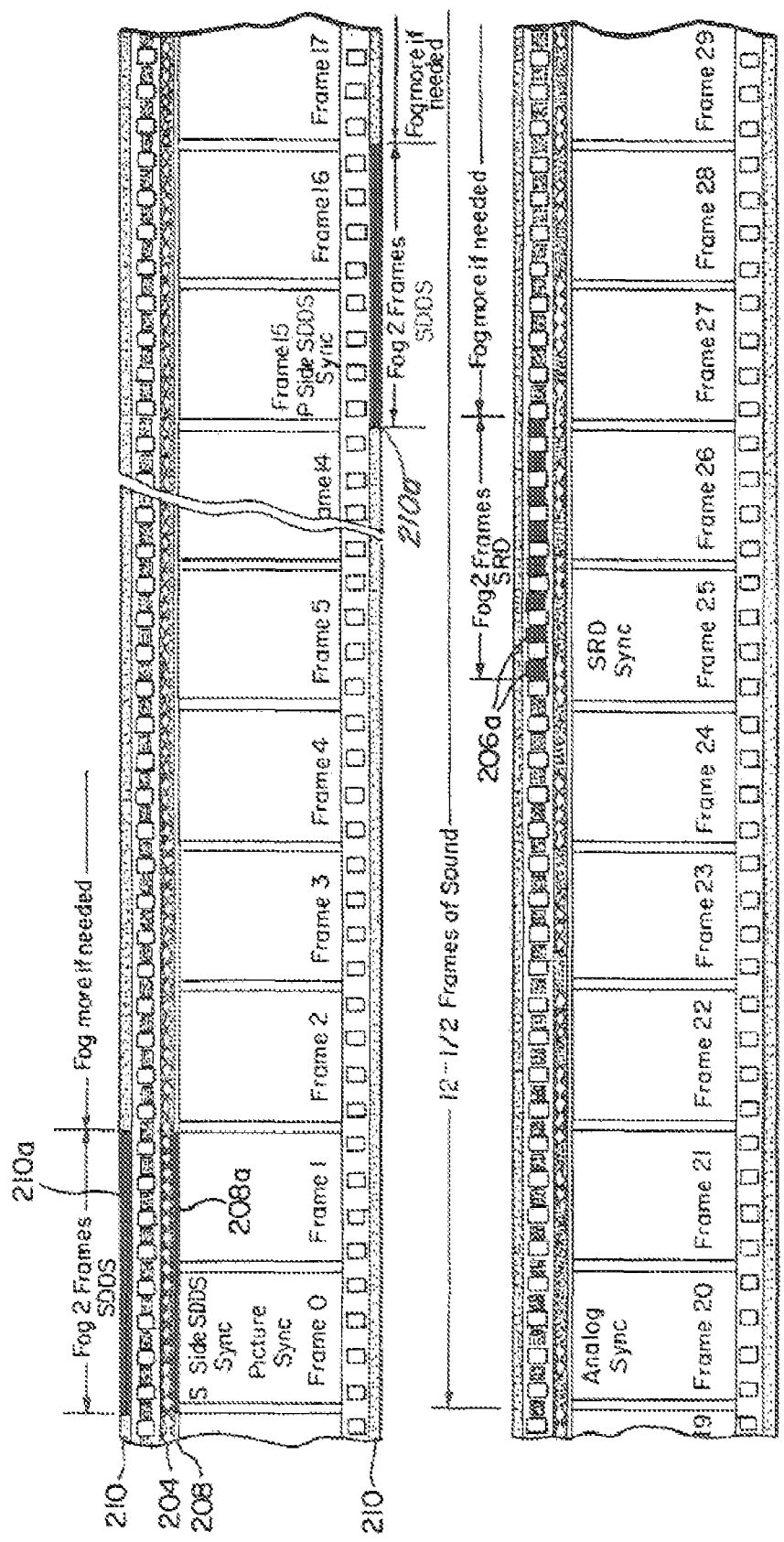
FIG. 3 is an illustration of segments of motion picture film in accordance with one exemplary embodiment of the present disclosure.

Referring to the film segments shown in FIG. 3, several examples of re-exposing of the digital tracks at locations 206a, 208a and 210a on the Dolby SR-D 206, DTS 208 and Sony SDDS 210 digital soundtracks, respectively, are shown. The amount of re-exposure applied to a respective digital soundtrack can be selected based on the parameters of the particular digital soundtrack that cause the motion picture to revert to the analog soundtrack. For example, the digital soundtrack parameters may require that the digital soundtrack be unreadable or contain no information for a certain number of frames or for a certain period of time before audio soundtrack reverts to the analog soundtrack. In another embodiment, specific commands can be inserted into the digital soundtracks themselves that cause the motion picture to revert to the analog soundtrack.

In one embodiment, the analog soundtrack is altered by selectively muting portions of the analog soundtrack at the selected location for the insertion of the identifiable code. The selectively muted portions may represent alphanumeric characters. For instance, the quantity, location, spacing and/or pattern of the muted portions can be used to identify alphanumeric characters. By selectively muting portions of the analog soundtrack, a sequence of alternating periods of silence (i.e., muted portions) and periods of the analog soundtrack is created at the selected location for inserting the identifiable code.

Referring now to FIG. 4A, a representative example of an analog soundtrack having a sequence of alternating periods of muted portions and periods of analog soundtrack is illustrated. The analog soundtrack 400 includes muted portions 402, for example that appear as darkened bars in the print film and will be referred to as "bars 402" in this example, that are formed by re-exposing the analog soundtrack at certain locations. The non-muted or non-altered periods 404 of the analog soundtrack are located between the bars 402, where the non-altered periods 404 will be referred to as "spaces 402" in this example. Thus, a sequence of alternating periods of bars 402 and spaces 404 are created in the analog soundtrack.

The position and duration of the various bars 402 and spaces 404 are selected so as to represent the identifiable code that is encoded number into the audio soundtrack. Any type of coding system may be utilized where selectively muting portions of the analog soundtrack will serve to encode an identifiable code into the analog soundtrack. For example, a 2 of 5 code may be employed, similar to bar code technology, where the bars 402 and spaces 404 are used to encode a five digit number and a check sum number. By using a 2 of 5 interleave code, the bars 402 and spaces 404 are interpreted as pairs, so that there must be an even number of digits represented by the bars 402 and spaces 404. For each pair, the first number is encoded in bars 402 and the second number is encoded in spaces 404, or vice versa. The duration and location of each of the bars 402 and spaces 404 are used to represent the digits of the identifiable code.

Referring now to one embodiment shown in the representative example of FIG. 4B, the 5 digit number "12345" is encoded in the audio soundtrack 400 using a 2 of 5 code interleave. In this embodiment, "N" signifies a narrow bar 402 or narrow space 404 that may be a ¼ frame in length, while a "W" signifies a wide bar 402 or wide space 404 spacing may be a ½ frame in length. Using the code table illustrated in FIG. 4C to identify the code for the corresponding digits, the analog soundtrack 400 is altered to create a combination of wide bars WB, narrow bars NB, wide spaces WS and narrow spaces NS over several frames in the print film. For example, the digits "12345" and the check sum value of "7" are encoded in the portion of the audio soundtrack 400 associated with frames 1-12½ where the first and last frames can signify the beginning and ending of the identifiable code. Each pair of digits is encoded with the first number being encoded in bars 402 and the second number encoded by spaces 404. Thus, the first two digits "12" are represented by the following bars 402 (1=WB–NB–NB–NB–WB) interleaved with the following spaces 404 (2=NS–WS–NS–NS–WS). In this example, the check sum number is paired with the last digit of the identifiable code. The check sum number is the sum of all of the odd numbers in the identifiable code multiplied by three, which is then added to the sum of the even numbers in the code, which is then subtracted from the next multiple of ten. In this example, for the identifiable code "12345," the check sum number would be calculated as follows:

$$((1+3+5)\times 3)+(2+4)=33$$

$$40-33=7=\text{check sum number}.$$

When using a 2 of 5 code as the encoding method, each digit is represented by a combination of 2 wide symbols (WBs or WSs) and 3 narrow symbols (NBs or NSs), so that each 5 digit number will have exactly the same length, namely 12½ frames based on the above example, no matter which combination of digits are selected. In this manner, the location of the identifiable code in the audio soundtrack can be exactly the same in every copy of the film print even though each film print may possess a unique identifiable code. In the above example, this corresponds to approximately ½ second of projection time when playing the audio soundtrack at the movie theater. However, it is understand that duration and length of the identifiable code will respectively vary based upon the number of digits selected to encode and the particular coding mechanism utilized. It is further understood that the code may be broken into unique parts and be separately recorded.

Figure 5:
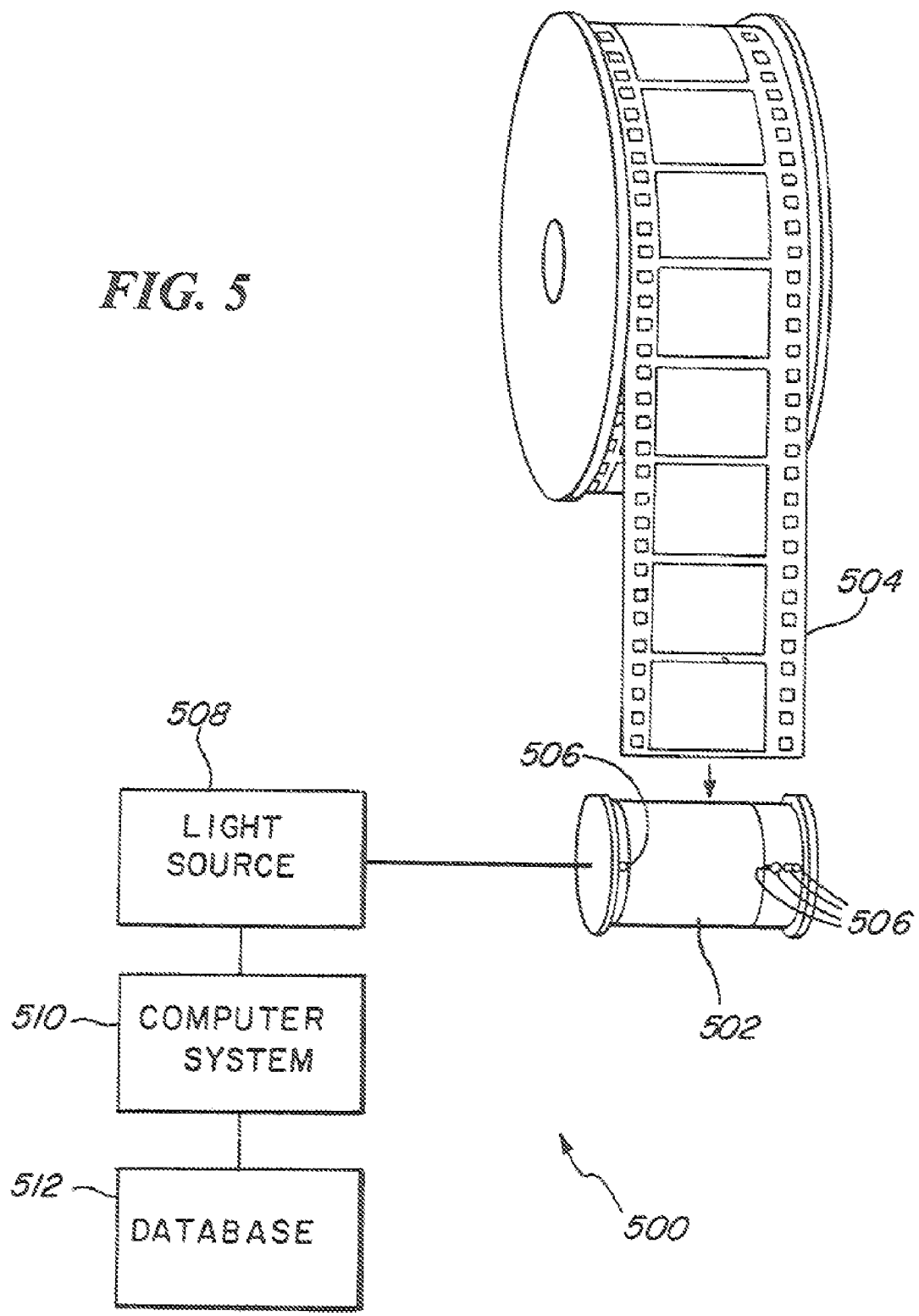
FIG. 5 is a perspective block schematic representation of a device for inserting an audio code into a audio soundtrack in accordance with one embodiment of the present disclosure.
Figure 6:
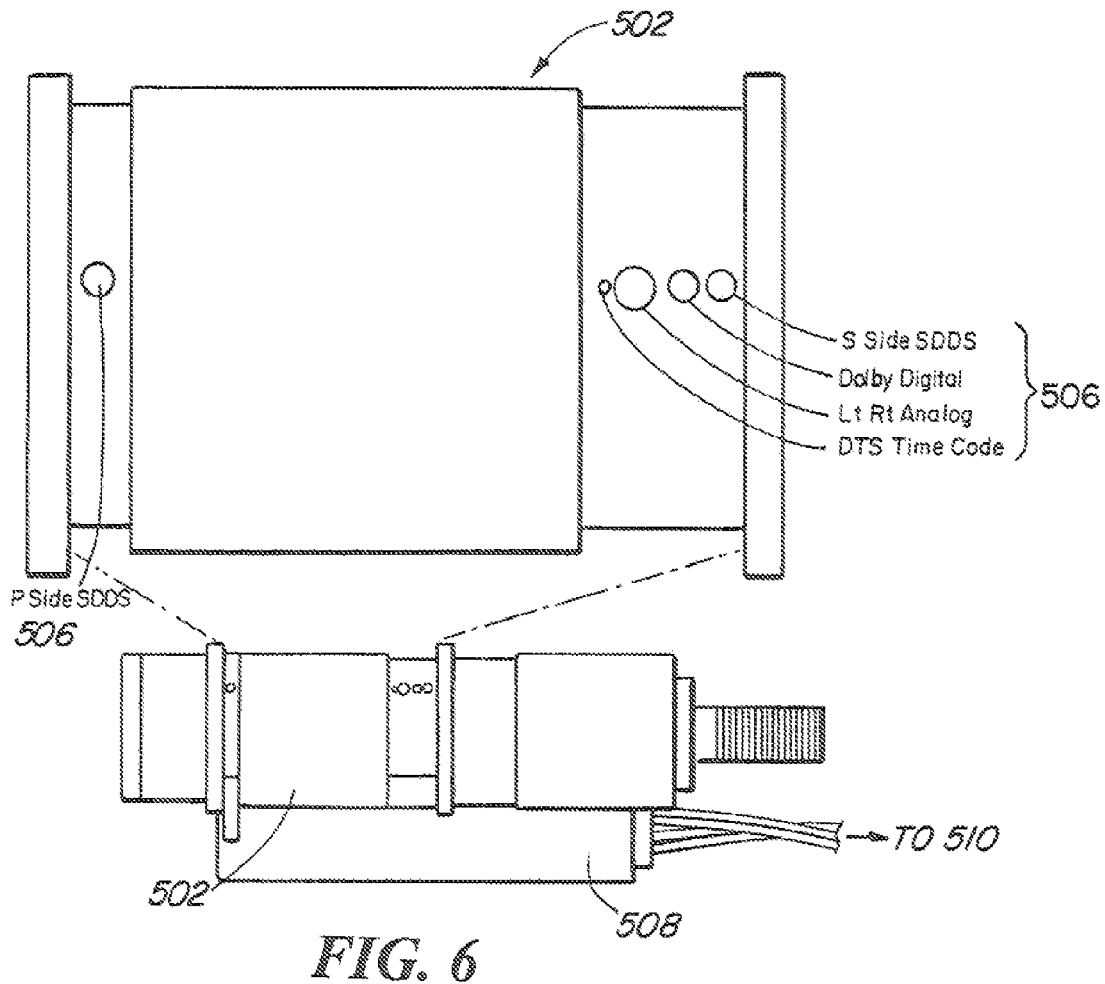
FIG. 6 is a perspective top view of the audio encoding device and close-up view of the film printing head in accordance with one embodiment of the present disclosure.
Figure 7:
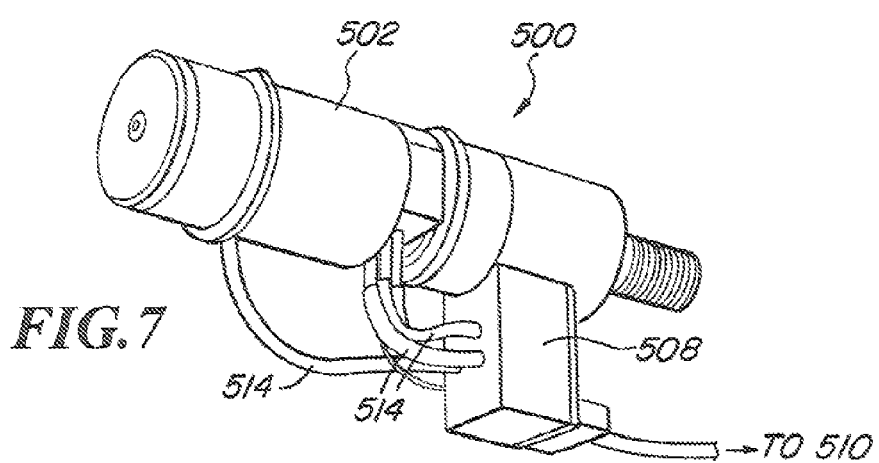
FIG. 7 is a perspective bottom view of the audio encoding device in accordance with one embodiment of the present disclosure.

Referring now to FIGS. 5-7, one embodiment of an audio encoding device 500 for altering the analog soundtrack is illustrated. The device 500 preferably includes a computer-controlled film printing head 502 that alters the audio soundtracks recorded on the film 504 during the printing process when the film 504 passes by the film printing head 502. The film printing head 502 includes a plurality of apertures 506 that are positioned to be in alignment with the respective digital and analog soundtracks recorded on the film 504 as the film 504 passes by the film print head 502. Each of the apertures 506 accommodates a light source 508 for delivering light to adjacent portions of the digital and analog soundtracks so as to re-expose the audio soundtrack in accordance with the various embodiments described herein. The light source 508 may be a single light source that delivers light to a plurality of apertures 506, such as through a plurality of optical fibers 514 leading from the light source 508 to the apertures 506, or may comprise several different light sources that individually provide light to each aperture 506. The light source 508 may comprise a laser, a light emitted diode (LED), a LED array or other light source suitable for re-exposing the film print as known to those skilled in the art. The light source 508, as controlled by an attached computer 510, is pulsed for the proper length of exposure of the film print and at the proper location to cause the desired re-exposure of the appropriate digital or analog soundtrack. In one aspect, different types of light sources can be used to create types of re-exposure to the film print. For example, a red LED could be utilized to create cyan exposure to the film print.

A program running on the computer 510 provides instructions to the audio encoding device 500 to control the particular identifiable codes that are encoded into the audio soundtrack and the particular locations at which the identifiable codes are inserted. The computer 510 further stores which identifiable code is associated with which particular film print in a database 512, so that it can be later used in forensic analysis to track down the source of a counterfeit copy of a motion picture. The identifiable code is further stored together with an identification of the location, entity or person who receives the copy of the film print when it is distributed, so as to enable suspected counterfeit copies of the motion picture to be analyzed to read the code number and identify the recipient of the copy and thereby track down the source of the counterfeit copies.

In one embodiment, the audio encoding device 500 can be used in conjunction with other motion picture encoding mechanisms. For example, various systems and methods have been developed for inserting identifiable codes into the images of film prints of motion pictures, such as the systems and methods described in U.S. patent application Ser. No. 10/657,287 filed on Sep. 9, 2003, and U.S. patent application Ser. No. 10/893,508 filed on Jul. 16, 2004, which are assigned to Deluxe Laboratories, Inc., the assignee of this patent application. The disclosures of these patent applications are hereby incorporated herein by reference in the present application. When used in conjunction, the same identifiable codes can be inserted into both the audio soundtrack and the images of the film print of the motion picture in different formats to provide an additional measure of protection in determining the origin of counterfeit copies of motion pictures. In such an embodiment, the computer 510 can serve to control both the audio encoding device 500 and an image encoding device.

In one embodiment, a visually perceptible version of the identifiable code that is encoded into the audio soundtrack is also inserted into the film print to enable a person viewing that copy of the film print to view the identifiable code associated with that particular copy. By providing a visual indication of the identifiable code on the film print, any person in the film print distribution chain can verify the particular copy of the film print they are in possession of according to the identifiable code. Thus, a person in the processing laboratory can use this visually perceptible identifiable code to associate that particular copy of a film print with a particular location to which that copy of the film print will be sent, where such information can be entered into the database 512 at that time. Further, a person at the location where the film print is received can easily verify that they have received the correct copy of the film print for their location by simply visually inspecting the copy of the film print. This allows film print distributors to contact a location where a film print is sent and request that the visually perceptible identifiable code be identified for verification purposes. In another manner, the person at the receiving location can be required to log the visually perceptible identifiable code associated with the copy that is received at that location, such as by entering such information into the database 512 or otherwise.

In one embodiment, the visually perceptible identifiable code is inserted into the leader area (i.e., beginning) of the film print to allow it to be easily located. In one aspect, portions of the leader area of the film print can be exposed to light to create exposed regions in the print that provide a visual representation of the identifiable code that is encoded into the audio soundtrack. For example, referring now to FIG. 8, the visually perceptible identifiable code can be inserted in the areas 602 between the perforations 604 in the film print 606, where certain areas 602 can be exposed to light to create exposed regions 608 (e.g., darkened bars) in the film print 606 that visually provide an indication of the identifiable code. The number of areas 602 between the perforations 604 in the film print 606 that are exposed (i.e., number of exposed regions 608) will represent the identifiable code, where each digit of the identifiable code is spaced apart from another digit by an unexposed region 610 between the perforations 604. By way of the example shown in FIG. 8, the identifiable code "12345" for a particular film print can be visually represented by the creating the following sequence of consecutive exposed regions 608 and unexposed regions 610:

1 exposed region 608="1"
Unexposed region 610
2 exposed regions 608="2"
Unexposed region 610
3 exposed regions 608="3"
Unexposed region 610
4 exposed regions 608="4"
Unexposed region 610
5 exposed regions 608="5"

Figure 8:
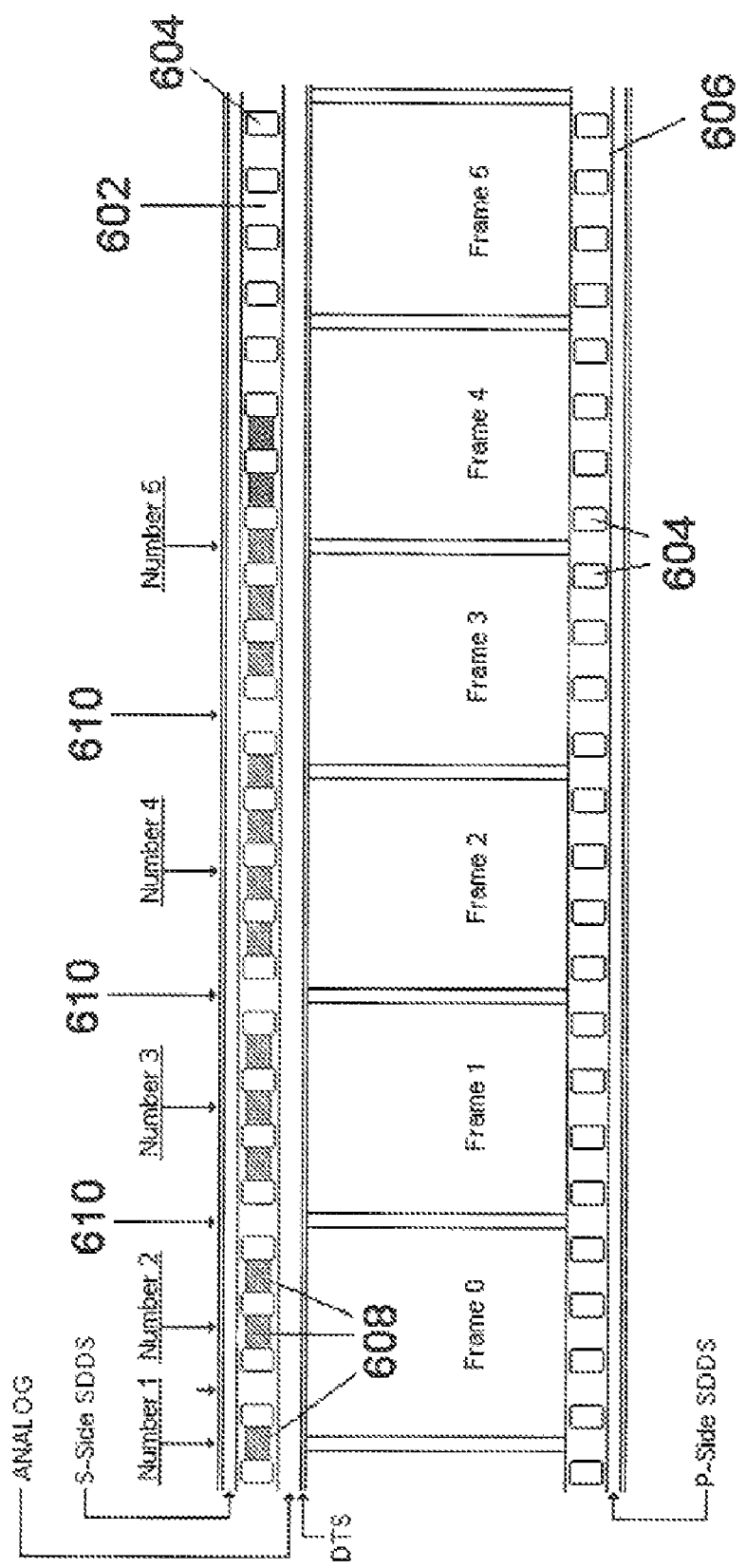
FIG. 8 is an illustration of a segment of motion picture film having a visible code in accordance with one exemplary embodiment of the present disclosure

This allows the identifiable code associated with a copy of a film print to be easily viewed for verification purposes by checking the leader of the film print. The above example shown and described with respect to FIG. 8 is but one manner in which a visual representation of the identifiable code can be placed on the film print, where it is understood that this and other types of visual representations can be utilized in connection with any of the embodiments described herein.

By utilizing the embodiments described herein, when a copy of a film print is played to an audience at a particular location (e.g., movie theater), the identifiable code inserted into the audio soundtrack will be broadcast to the audience. Thus, any person in the audience recording the audio soundtrack will also record the identifiable code. When counterfeit copies of the audio soundtrack are made, those copies will also possess the identifiable code. Forensic analysis can be performed on counterfeit copies by analyzing the recorded waveform of the soundtrack to determine the identifiable code encoded therein. For each motion picture, the exact location of where the identifiable code is inserted into the audio soundtrack will be known. Further, for each copy of the motion picture, the particular codes that were encoded into the various copies of the motion picture can be retrieved from the database 512. Forensic analysis can thus examine the exact locations in the audio soundtrack to identify the code represented by the sequence of alternating periods of muted portions 402 and periods of audio soundtrack 404.

By allowing each film print to be uniquely encoded at the selected locations in the audio soundtrack, particular locations can be selected for every film print that is substantially unnoticeable to a listener. It is also possible to uniquely encode each copy at exactly the same location in the audio soundtrack. This provides a robust system and method of audio encoding the soundtrack of a copy of a motion picture with a uniquely identifiable code that is uniformly positioned at the same location in all copies of the motion picture to make forensic analysis of the motion picture a much simpler and efficient process.

In one aspect, by encoding unique codes at selected locations in each film print, a substantial number of unique copies of film prints can be made. Each copy of the film print can be provided its own unique code, where the number of unique codes that can be assigned is only limited by the number of different codes available to a particular coding scheme. Coding schemes can be selected based upon the number of unique numbers required (e.g., based on the number of film prints being distributed). Prior systems that relied upon specific locations in the film print to place markings or artifacts were limited by the number of locations that could be selected, thereby limiting the number of unique codes that can be generated for film prints in such prior systems. To the contrary, the methods and systems of the present disclosure for encoding an identifiable code into the audio content of a copy of a motion picture provide a more robust and efficient coding mechanism that allow a large number of unique copies of film prints to be distributed. This is especially useful when distributing thousands of copies of film prints to movie theaters around the world.

The various embodiments described herein allow a counterfeit or pirated copy of a film print to be analyzed to identify the exact location at which the film print was pirated. Each location where a film print is displayed (e.g., specific movie theaters) can be assigned its own unique code, where that unique code is embedded within the film print distributed to that location. By identifying the specific location where a pirated copy of a film print is made, targeted investigations and countermeasures can be put into place at specific locations to catch counterfeiters and prevent further pirating from occurring in the future.

Another preferred embodiment of the present disclosure is directed to digital cinema. Digital cinema refers to the use of digital technology to distribute digital copies of motion pictures and project motion pictures using a digital projector. Copies of motion pictures are distributed in an entirely digital form ("digital copies"), such that digital copies can be distributed via stored media (e.g., hard drives, DVDs, etc.) or via communication channels (e.g., satellite, Internet or other networks, etc.). In digital cinema, all of the video and audio information associated with a motion picture is represented in digital form as digital video and digital audio, where such information is either originally recorded in digital form or it is ultimately converted from analog to digital form. In this embodiment, the digital audio in each digital copy of a motion picture can be altered to include a unique identifiable code that will be played at selected locations in the audio soundtrack so that the identifiable code is broadcast to a listening audience in a similar manner as the above-described embodiments in which the analog soundtrack of a film print is modified.

In the digital cinema embodiment, a location in the audio soundtrack of the motion picture to insert the identifiable code is similarly selected based upon the sound characteristics of the audio soundtrack. The digital audio content associated with the selected location(s) would be modified or replaced with digital code content that would cause the identifiable code to be broadcast to a listening audience with the audio soundtrack that is being broadcast. For instance, the digital code content may digitally represent a sequence of alternating periods of silence (e.g., muted portions) and periods of audio soundtrack. In one aspect, the digital audio may be altered at any point before, during or after the formation of the digital copies, prior to their distribution, to insert the unique identifiable codes into each of the copies. Forensic analysis of pirated copies of motion pictures that were pirated from digital cinema can be performed in the same manner as described herein with respect to the other embodiments of the present disclosure to identify the specific location where the pirated copy was made.

By way of example only, one implementation of digital cinema is described in the Digital Cinema System Specification published by the Digital Cinema Initiatives (DCI). According to DCI's specification, when all of the sound, picture, and data elements of a production have been completed, they may be assembled into a Digital Cinema Distribution Master (DCDM) which contains all of the digital material needed for a motion picture. The DCI specification then describes that the images and sound are then compressed, encrypted, and packaged to form the Digital Cinema Package (DCP) (e.g., the digital copies that are distributed). In one aspect, the digital audio may be altered at any point before, during or after the formation of the DCP to insert the unique identifiable codes into each of the copies. The audio encoding device that is used to insert the unique identifiable codes may be the same device that is used to form the DCP or can be any computer-controlled device that is compliant with DCI's specifications or other digital cinema specifications.

In an alternative embodiment, rather than physically altering the audio soundtrack recorded on the distributed copies of film print (or digital copies), the audio soundtrack can be altered at the time it is broadcast at a particular location. Each location that receives a distributed copy of the film print may be identified by its own unique identifiable code, where a database is maintained of locations and their associated identifiable codes. During playback of the motion picture, the sound system of each location can then briefly interrupt the audio soundtrack to insert its own identifiable code into the audio soundtrack that is being broadcast, such that anyone in the audience recording the audio soundtrack would also record the broadcast identifiable code. Rather than alter the film print to form an identifiable code and read the identifiable code from the film print to then broadcast the identifiable code during playback, the system would read an unaltered audio soundtrack from the film print and then introduce alterations into the audio soundtrack after it has already been read from the film print. Playback of the audio soundtrack would be interrupted to insert a plurality of muted portions so that the broadcast waveform would include a sequence of alternating periods of silence (i.e., muted portion) and periods of the analog soundtrack, where such a sequence would represent an identifiable code as described hereinabove. The waveforms of counterfeit copies of any audio soundtracks could then be analyzed as described herein to identify the code encoded into the audio soundtrack and thereby determine the location where counterfeit copy was recorded. This alternative embodiment allows identical copies of a motion picture to be distributed where the identifiable codes are inserted by the motion picture playback devices at each location.

This alternative embodiment could also be useful for other types of performances where audio content is often illegally recorded and counterfeit copies are distributed (e.g., concerts, speeches, training programs, etc.), where the broadcasting sound system at the location of the performance inserts its own unique identifiable code at least once into the broadcast performance. The performance being broadcast could be live or prerecorded, where any recording of the broadcast performance would necessarily include the identifiable code that is embedded in the broadcast. Forensic analysis can be performed as described herein by simply analyzing the recorded waveform for the presence of the unique code as represented by a sequence of alternating periods of silence and audio content.

While the system and method have been described in terms of what are presently considered to be specific embodiments, the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method for uniquely identifying a plurality of copies of an audio recording, said method comprising: altering copies of the audio recording at a selected location to create a code in the audio recording, wherein each of the copies of the audio recording is altered differently at the selected location in the audio recording so that each of the copies of the audio recording has its own unique code, wherein the audio recording altering step includes selectively muting portions of the audio recording at the selected location to create the code in the audio recording.

2. The method of claim 1, wherein the copies of the audio recording include an analog soundtrack that is altered by the audio recording altering step to insert the code into the analog soundtrack.

3. The method of claim 2, wherein the copies of the audio recording further include at least one digital soundtrack, the method further comprising altering the digital soundtrack to cause the analog soundtrack to be played at the selected location where the analog soundtrack is altered.

4. The method of claim 3, wherein the copy of the audio recording is a film copy of a motion picture having an audio soundtrack, wherein the digital soundtrack is altered by re-exposing the digital soundtrack on the copy of the motion picture.

5. The method of claim 2, wherein the copy of the audio recording is a film copy of a motion picture having an audio soundtrack, wherein the analog soundtrack is muted by re-exposing the analog soundtrack on the copy of the motion picture.

6. The method of claim 1, further comprising selecting the location to create the code in the audio recording by choosing a portion of the audio recording where the alternation will be substantially unnoticeable to a listener.

7. The method of claim 1, further comprising storing information representing the unique codes associated with each of the copies of the audio recording at a location separate from the copies.

8. The method of claim 1, further comprising distributing said copies to a plurality of recipients, recording the identity of each of said recipients, and storing the unique code of each copy distributed to each of said recipients.

9. The method of claim 1, further comprising selecting additional locations in the audio recording to alter the audio recording and repeating the audio recording altering step at the selected additional locations to insert the unique code at multiple locations in the audio recording.

10. The method of claim 1, further comprising inserting a visual representation of the unique code into the copy of the audio recording.

11. A method for uniquely identifying a plurality of copies of an audio recording, said method comprising: altering copies of the audio recording at a selected location to create a code in the audio recording, wherein each of the copies of the audio recording is altered differently at the selected location in the audio recording so that each of the copies of the audio recording has its own unique code, wherein the code is created by altering the audio recording to include a sequence of alternating periods of silence and periods of audio recording.

12. The method of claim 11, further comprising utilizing a 2 of 5 code for the sequence.

13. The method of claim 11, wherein the copies of the audio recording include a digital soundtrack, the method further comprising:
altering the digital soundtrack at a selected location to insert a digital representation of the code into the digital soundtrack.

14. An apparatus for uniquely identifying a plurality of copies of an audio recording, said apparatus comprising:
a computer-controlled device for altering copies of an audio recording at a selected location to create a code in the audio recording, wherein each of the copies of the audio recording is altered differently at the same selected location in the audio recording so that each of the copies of the audio recording has its own unique code, wherein the computer-controlled device alters the audio recording by causing portions of the audio recording to be selectively muted at the selected location to create the code in the audio recording.

15. The apparatus of claim 14, wherein the copy of the audio recording is a film copy of a motion picture having an audio soundtrack, wherein the computer-controlled device selectively mutes the audio soundtrack by re-exposing the audio soundtrack on the film copy of the motion picture.

16. The apparatus of claim 15, wherein the copy of the motion picture further include at least one digital soundtrack, wherein the computer-controlled device alters the at least one digital soundtrack to cause the selectively muted portion of the audio soundtrack to be played at the selected location where the audio recording is altered.

17. The apparatus of claim 16, wherein the computer-controlled device alters the digital soundtrack by re-exposing the digital soundtrack on the film copy of the motion picture.

18. The apparatus of claim 14, wherein the computer-controlled device includes at least one light source for altering the audio recording using emitted light.

19. The apparatus of claim 18, wherein the at least one light source respectively alters digital and analog soundtrack components of the audio recording.

20. The apparatus of claim 14, wherein the copies of the audio recording include a digital soundtrack, wherein the computer-controlled device alters the digital soundtrack at a selected location to insert a digital representation of the code into the digital soundtrack.

21. The apparatus of claim 14, wherein the computer-controlled device inserts a visual representation of the unique code into the copy of the audio recording.

22. An audio soundtrack recorded on a medium bearing a coded identification number, the audio soundtrack including a coded portion including a plurality of muted segments that at least partially represent the coded identification number, wherein the audio soundtrack is located on a motion picture film copy.

23. The audio soundtrack recording of claim 22, wherein the coded portion of the audio soundtrack includes alternating segments of audio content and muted segments.

24. The audio soundtrack of claim 22, further comprising a visual representation of the coded identification number.

25. An audio soundtrack recorded on a medium bearing a coded identification number, the audio soundtrack including a coded portion including a plurality of muted segments that at least partially represent the coded identification number, wherein the audio soundtrack is located on a digital copy of a motion picture.

26. The audio soundtrack recording of claim 25, wherein the coded portion of the audio soundtrack includes alternating segments of audio content and muted segments.

* * * * *